(12) United States Patent
Croak et al.

(10) Patent No.: US 8,644,296 B1
(45) Date of Patent: Feb. 4, 2014

(54) METHOD AND APPARATUS FOR ESTABLISHING A MEDIA PATH BETWEEN A GATEWAY SYSTEM AND A BORDER ELEMENT

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1678 days.

(21) Appl. No.: 11/023,793

(22) Filed: Dec. 28, 2004

(51) Int. Cl.
*H04L 12/66* (2006.01)

(52) U.S. Cl.
USPC .......................................................... 370/352

(58) Field of Classification Search
USPC .................. 370/352–356, 328, 401, 329; 379/221.13; 709/229
See application file for complete search history.

(56) References Cited

U.S. PATENT DOCUMENTS

| | | | |
|---|---|---|---|
| 6,865,266 B1 * | 3/2005 | Pershan | 379/221.13 |
| 7,197,567 B1 * | 3/2007 | Fitzgerald | 709/227 |
| 7,380,011 B2 * | 5/2008 | Li et al. | 709/227 |
| 7,486,684 B2 * | 2/2009 | Chu et al. | 370/401 |
| 2002/0071427 A1 * | 6/2002 | Schneider et al. | 370/352 |
| 2002/0126633 A1 * | 9/2002 | Mizutani et al. | 370/329 |
| 2003/0091026 A1 * | 5/2003 | Penfield et al. | 370/352 |
| 2003/0169751 A1 * | 9/2003 | Pulkka et al. | 370/401 |
| 2003/0219103 A1 * | 11/2003 | Rao et al. | 379/32.05 |
| 2006/0083193 A1 * | 4/2006 | Womack et al. | 370/328 |

* cited by examiner

*Primary Examiner* — Duc Nguyen
*Assistant Examiner* — Sonia Gay

(57) ABSTRACT

The invention comprises a method and apparatus for establishing at least one media path. Specifically, the method comprises receiving at least one connection request message, generating at least one connection setup message in response to each of the at least one connection request message, and transmitting the at least one connection setup message towards at least one communication network comprising at least one call control element, each of the at least one connection setup message operable to establish the at least one media path between at least one gateway system and at least one border element.

12 Claims, 5 Drawing Sheets

METHOD AND APPARATUS FOR ESTABLISHING A MEDIA PATH BETWEEN A GATEWAY SYSTEM AND A BORDER ELEMENT

FIELD OF THE INVENTION

The invention relates to the field of communication networks and, more specifically, to media path establishment in Internet Protocol networks.

BACKGROUND OF THE INVENTION

In general, voice-over-Internet-Protocol (VOIP) service providers typically provision Time Division Multiplexing (TDM) facilities between TDM local switches located within the Publicly Switched Telephone Network (PSTN) and TDM-IP gateway switches located within the VOIP network. The TDM facilities are used in order to provide ingress access and egress access to PSTN endpoints, enabling the PSTN endpoints to access IP endpoints and enabling IP endpoints to access the PSTN endpoints. Unfortunately, dedicated TDM facilities do not provide the same level of resiliency to network failures that is provided by IP networks, especially for inbound traffic originating from PSTN endpoints and terminating on IP endpoints.

For such ingress traffic originating from PSTN endpoints, service providers must typically provision subscriber telephone numbers on the TDM local switches. The TDM local switches then map each of the subscriber telephone numbers to the address of at least one TDM-IP gateway switch deployed within the VOIP network. The TDM facilities are then provisioned between TDM local switches within the PSTN and TDM-IP gateway switches within the VOIP network in order to route both signaling and media traffic between the PSTN network and the VOIP network.

Unless a VOIP service provider invests in redundant TDM facilities between the TDM local switches and the associated TDM-IP gateway switches, unavailability of a required TDM facility between a TDM local switch and a TDM-IP gateway switch will prevent the completion of connections between the PSTN endpoints and IP endpoints. Unfortunately, the expense and complexity associated with deploying redundant TDM facilities makes the use of such redundant TDM facilities prohibitive. This is especially true for VOIP service providers interfacing with a large number of TDM local switches.

Accordingly, a need exists in the art for a method and apparatus for establishing a media path between a TDM-IP gateway switch and a border element such that reliance on TDM facilities between TDM local switches and TDM-IP gateway switches is minimized.

SUMMARY OF THE INVENTION

In one embodiment, the invention comprises a method and apparatus for establishing at least one media path. Specifically, the method comprises receiving at least one connection request message, generating at least one connection setup message in response to each of the at least one connection request message, and transmitting the at least one connection setup message towards at least one communication network comprising at least one call control element, each of the at least one connection setup message operable to establish the at least one media path between at least one gateway system and at least one border element.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention is discussed in the context of a network architecture comprising a Publicly Switched Telephone Network (PSTN) and an Internet Protocol (IP) network; however, the methodology of the invention can readily be applied to other networks and network topologies. A PSTN is broadly defined as a concatenation of circuit-switched telephone systems for carrying voice signals. An IP network is broadly defined as a network that uses Internet Protocol to exchange data packets. A VOIP network is broadly defined as a network that is capable of carrying voice signals as packetized data over an IP network. Although specifically described herein with respect to a PSTN circuit-switched network and a VOIP packet-switched network, it should be noted that the methodologies of the present invention may be implement using like circuit-switched networks and packet-switched networks as known in the art.

In general, the present invention enables a service provider to establish a media path between a border element within a VOIP network and a TDM-IP gateway, where the TDM-IP gateway is located outside of the VOIP network. The present invention extends the TDM-IP demarcation point closer to the PSTN network, ensuring that use of IP to carry traffic between a PSTN and an IP network is maximized. As such, the media path supports traffic carried in a connection between a PSTN endpoint and an IP endpoint. In other words, the present invention minimizes the dependency of connections between PSTN endpoints and IP endpoints on the use of less-reliable TDM equipment and facilities between the TDM local switches and TDM-IP gateways.

Figure 1:
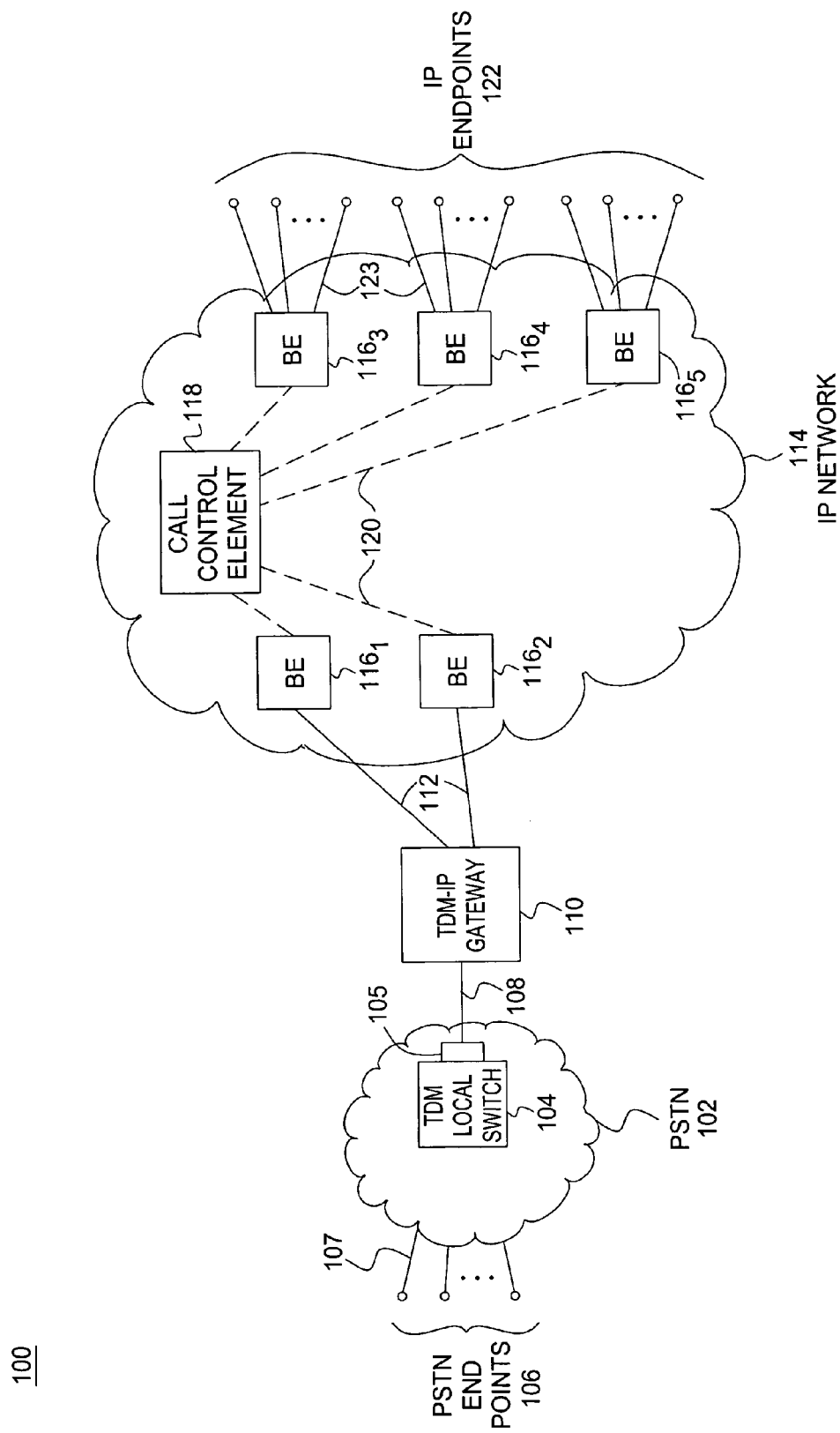
FIG. 1 depicts a high level block diagram of a network architecture.

FIG. 1 depicts a high level block diagram of a network architecture. Specifically, network architecture 100 of FIG. 1 comprises a PSTN 102, a TDM-IP gateway (TIG) 110, and an IP network 114. The PSTN 102 comprises a TDM local switch (TLS) 104. The IP network 114 comprises a call control element (CCE) 118 and a plurality of border elements (BEs) 116 (collectively, BEs 116). As depicted in FIG. 1, TLS 104 communicates with TIG 110 via link 108, and TIG 110 communicates with BEs $116_1$ and $116_2$ via a plurality of IP communication links (IPCLs) 112 (collectively, IPCLs 112). Furthermore, CCE 118 maintains a respective plurality of Session Initiation Protocol (SIP) sessions 120 (collectively, SIP sessions 120) with the BEs 116.

As depicted in FIG. 1, TIG 110 comprises a network element capable of receiving TDM-based traffic from PSTN 102 and packetizing the TDM-based traffic for transport over IP network 114, and capable of receiving IP-based traffic from IP network 114 and depacketizing the IP-based traffic for transport over PSTN 102. In other words, TIG 110 essentially operates as a TDM-IP service demarcation device, enabling a service provider to convert TDM traffic to IP traffic closer to the PSTN, and to transport IP traffic closer to the PSTN before converting the IP traffic to TDM traffic. The link 108 enables communication between TLS 104 and TIG 110. As such, deployment of TIG 110 proximate to TLS 104 significantly decreases dependency by PSTN endpoints on TDM circuit-switched connections for transporting traffic between the TLS 104 and the BEs 116. In one embodiment, link 108 may comprise a direct, hardwired connection between TLS 104 and TIG 110.

In one embodiment, the TDM-IP demarcation point may be extended to the edge of PSTN 102. For example, TLS 104 may optionally comprise a packet processing interface 105 for packetizing TDM traffic transmitted from TLS 104 towards IP network 114, and for depacketizing IP traffic transmitted from TIG 110 towards PSTN 102. It should be noted that in this embodiment, TIG 110 essentially operates as an IP-IP gateway (i.e., a router) since there is no conversion between circuit-switched traffic and packet-switched traffic. Similarly, it should be noted that in this embodiment, TLS 104 and associated packet processing interface 105 operate together to function as a TDM-IP gateway, further eliminating the dependency on TDM facilities. In this embodiment, link 108 may operate as a communication link capable of supporting IP packet-switched traffic.

As depicted in FIG. 1, a plurality of PSTN endpoints 106 (collectively, PSTN endpoints 106) access PSTN 102 via a respective plurality of TDM access links 107 (collectively, TDM access links 107). A PSTN endpoint may comprise a TDM phone, a Private Branch Exchange (PBX), and like TDM network endpoints. Although depicted as directly connected to PSTN 102, those skilled in the art will appreciate that each of the PSTN endpoints 106 may establish a connection with TLS 104 via circuit-switched equipment and associated communication links (not depicted). In one embodiment, at least a portion of the PSTN endpoints 106 may establish respective connections with TLS 104 via TDM access networks (not depicted) comprising multiplexers, TDM PBXs, Signaling System Seven (SS7) networks, and like TDM access equipment.

Similarly, a plurality of IP endpoints 122 (collectively, IP endpoints 122) access IP network 114 via a respective plurality of IP access links 123 (collectively, IP access links 123). An IP endpoint may comprise an IP phone, a SIP phone, a computer, an IP-PBX, and like IP network endpoints. Although depicted as directly connected to the IP network 114, those skilled in the art will appreciate that each of the IP endpoints 122 may establish a connection with IP network 114 via IP access equipment and associated communication links (not depicted). In one embodiment, at least a portion of the IP endpoints 122 may establish respective sessions with the BEs 116 via IP access networks and equipment (not depicted) such as cable networks, digital subscriber line (DSL) networks, managed routers, terminal adapters (TAs), media terminal adapters (MTAs), and like IP access equipment.

In general, CCE 118 comprises a call control element for managing the BEs 116 (including monitoring the congestion level of each BE), setting up and tearing down call legs in IP network 114, enforcing various routing policies, instructing the BEs 116 to redirect media channels associated with a particular call to a different destination, communicating with other IP networks (not depicted), and providing like functionality. It should be noted that although CCE 118 may function as a SIP back-to-back user agent (B2BUA), and may operate as a signaling end-point for call legs established between the BEs 116, media paths carried over IP network 114 are established directly between the BEs 116 without traversing the CCE 118. As described herein, CCE 118 maintains a respective plurality of SIP sessions 120 with the BEs 116 in support of this functionality.

The BEs 116 may comprise network elements (such as routers, switches, and the like) through which each of the IP endpoints 122 connects to a service provider network (illustratively, IP network 114). In one embodiment, the BEs 112 may perform functions such as routing, call admission control (CAC), media control, security, signaling, and the like. For example, a BE may translate between access protocols and SIP, enforce security to prevent unauthorized access to the IP network 114, enforce admission policies in accordance with CAC (such as call gapping, call limiting, bandwidth management, and the like), detect Dual Tone Multi-Frequency (DTMF) and similar in-band user requests, examine media streams, redirect media streams in response to instructions from a CCE 118, and the like.

In one embodiment, at least one of the BEs 116 may comprise a Media Gateway Control Protocol (MGCP) BE for controlling communication between a MGCP network and IP network 114. In general, MGCP comprises a signaling standard for the conversion of audio signals to data packets carried over the Internet or other packet networks. In another embodiment, at least one of the BEs 116 may comprise a SIP BE for controlling communication between SIP-based networks and IP network 114. In another embodiment, at least one of the BEs 116 may comprise a H.323 BE for controlling communication between H.323 customer premise equipment (CPE) gateway networks and IP network 114. A H.323 BE may provide gatekeeper-routed signaling from the access side, and may operate as a SIP user agent from the perspective of CCE 118.

Although not depicted, it should be noted that various other IP systems and associated services may be supported by IP network 114. For example, IP network 114 may comprise a plurality of resource servers (RSs) and a plurality of service elements (SEs). For example, the plurality of RSs may comprise a media server, an E-911 server, a CALEA server, and like systems. The media server may co-manage media streams, providing functions such as announcement, DTMF, text-to-speech, automatic speech recognition (ASR), call bridging, and like functionality. The E-911 server may route emergency calls to appropriate Public Safety Answering Points (PSAPs). The CALEA server may intercept various communications for law enforcement and other purposes, providing the capability to collect the content of voice calls.

Similarly, the SEs 130 may comprise a call admission controller (CAC), a network routing engine (NRE), a service broker (SB), a user profile engine (UPE), and like systems. The CAC may provide network-wide admission policy enforcement, including capacity management, congestion control, firewall restriction control, service level agreement (SLA) interpretation, network address translation (NAT), and like functionality. The NRE may provide route information to CCE 118 and the BEs 116 that is required for establishing call legs between the BEs 116. The NRE may translate network addresses to IP addresses, and may maintain a database comprising lists of BEs through which IP endpoints 122 may be reached. The SB may provide CCEs with addresses, and may maintain subscriber service information using a database of activated services. The UPE may maintain user profiles comprising user data, such as registered devices, presence information, geographic location information, and like user data.

Although specific network topologies are depicted and described with respect to FIG. 1, those skilled in the art will appreciate that PSTN 102, IP network 114, and TIG 110 may be implemented using a variety of network configurations without deviating from the scope of the present invention. As such, although specific numbers of PSTN endpoints, TDM access links, TDM networks, TLSs, links, IPGs, IPCLs, IP networks, BEs, CCEs, SIP sessions, IP endpoints, and IP access links are depicted and described with respect to FIG. 1, it should be noted that fewer or more PSTN endpoints, TDM access links, TLSs, IPCLs, BEs, SIP sessions, IP endpoints, and IP access links may be used, and that more TDM networks, links, IPGs, IP networks, and CCEs may be used.

Figure 2:
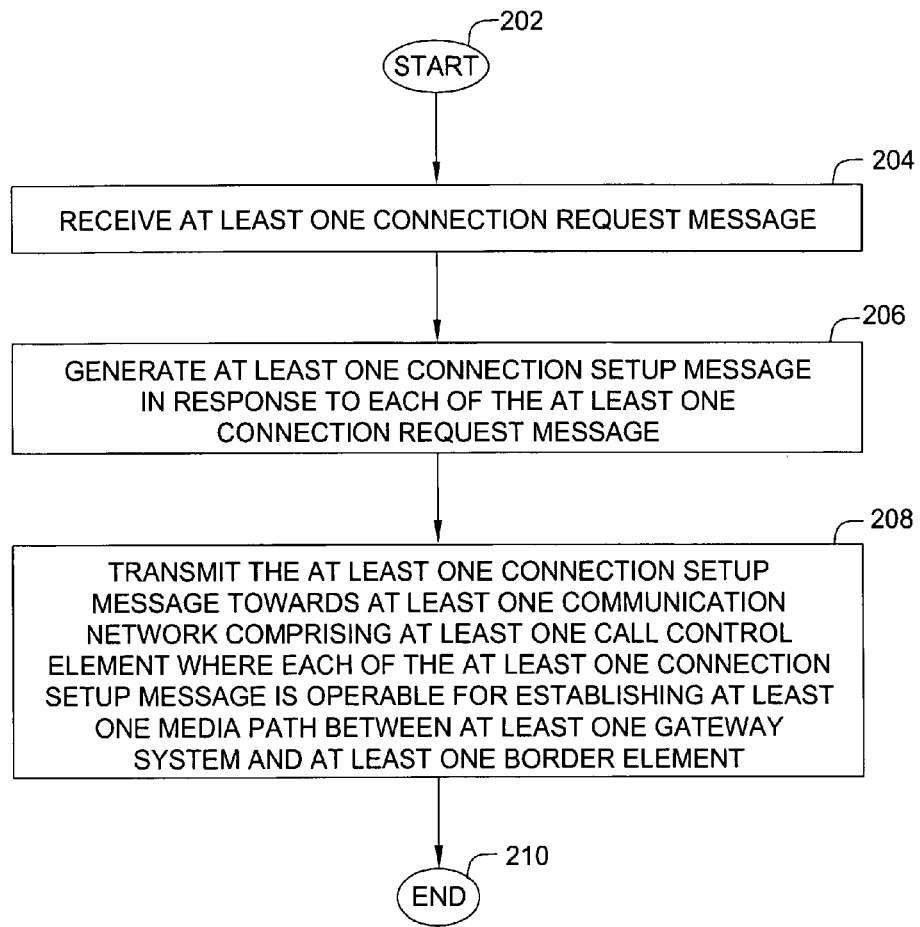
FIG. 2 depicts a flow diagram of a method according to one embodiment of the invention.

FIG. 2 depicts a flow diagram of a method according to one embodiment of the invention. Specifically, method 200 of FIG. 2 comprises a method for establishing at least one media path. The method 200 is entered at step 202 and proceeds to step 204. At step 204, at least one connection request message is received. At step 206, at least one connection setup message is generated in response to each of the at least one connection request message. At step 208, the at least one connection setup message is transmitted towards at least one communication network comprising at least one call control element, where each of the at least one connection setup message is operable to establish at least one media path between at least one gateway system and at least one border element. The method 200 then proceeds to step 210 where method 200 ends.

In one embodiment, the at least one border element is located within an IP network (illustratively, IP network 114) and the at least one gateway system is located outside of the IP network. In another embodiment, the at least one gateway system may be operable for converting network traffic between Internet Protocol (IP) traffic and Time Division Multiplexing (TDM) traffic. In another embodiment, each of the at least one media path comprises a portion of at least one respective connection, where the at least one connection is established between at least one Internet Protocol (IP) endpoint and at least one Publicly Switched Telephone Network (PSTN) endpoint.

Figure 3:
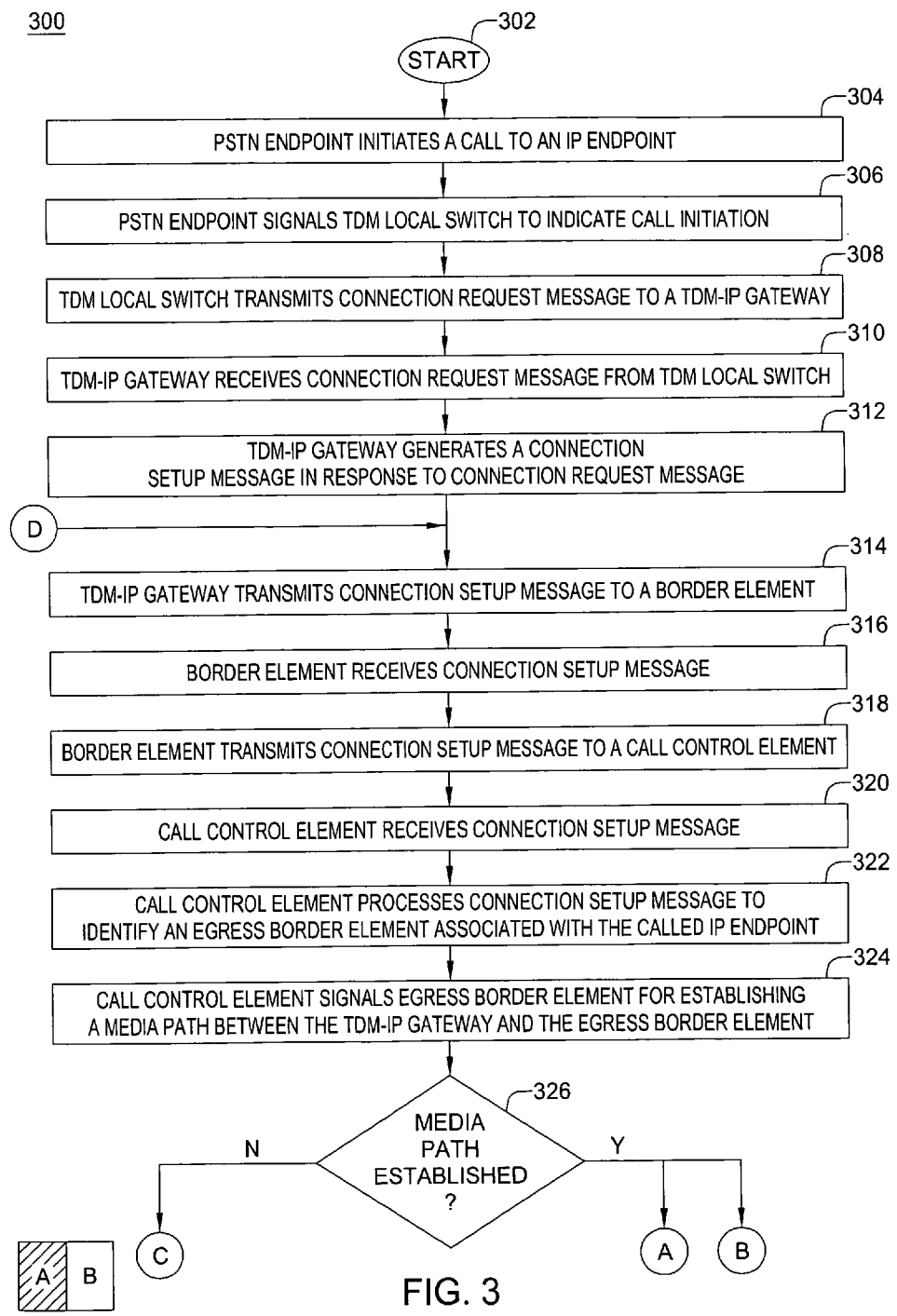
FIG. 3 depicts a detailed flow diagram of the method depicted in FIG. 2.
Figure 3:
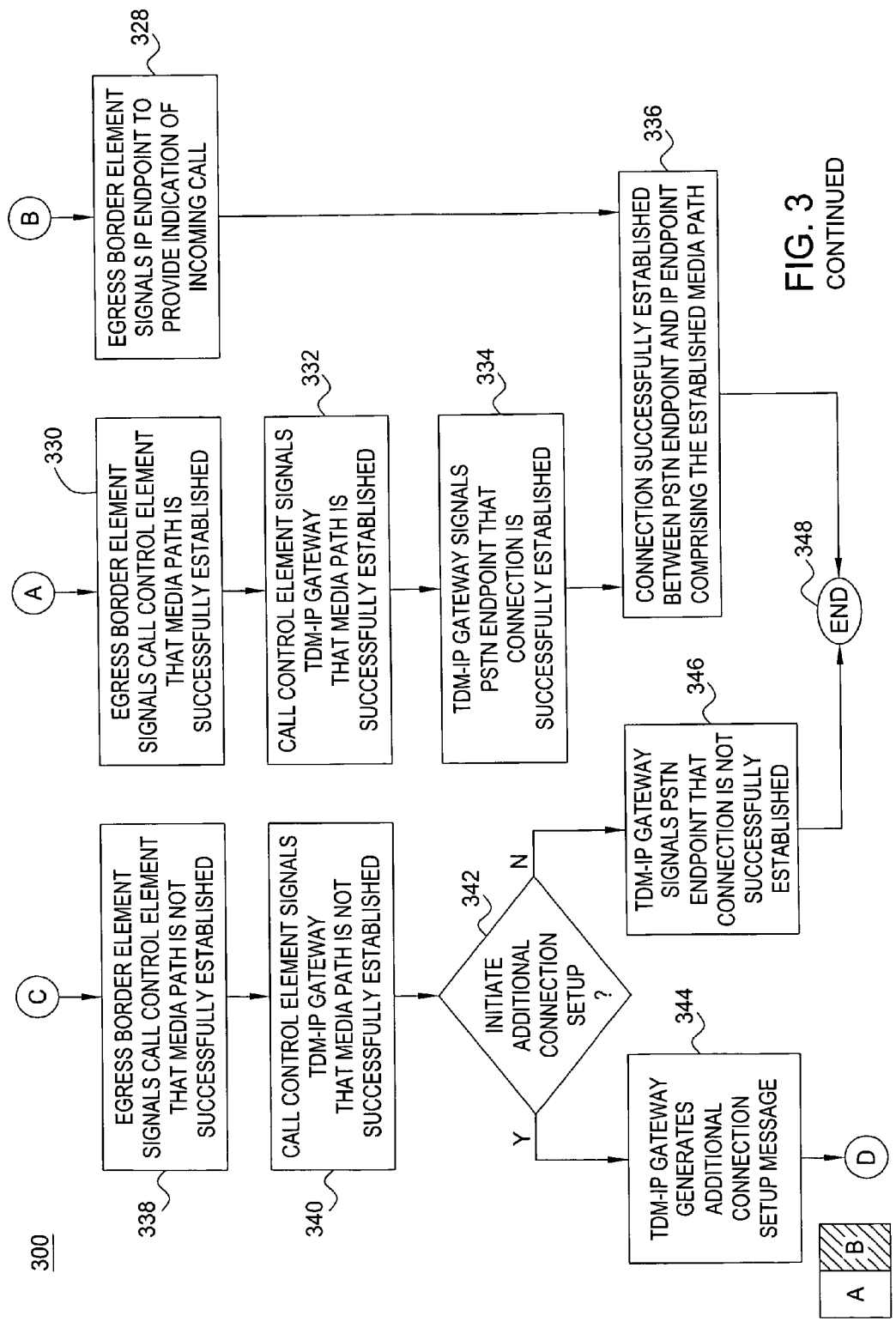

FIG. 3 depicts a detailed flow diagram of the method depicted in FIG. 2. As such, a single step as depicted in FIG. 2 may correspond to multiple steps as depicted in FIG. 3. Specifically, method 300 of FIG. 3 comprises a method for establishing at least one media path. Although depicted as being performed serially, those skilled in the art will appreciate that at least a portion of the steps of method 300 may be performed contemporaneously. The method 300 is entered at step 302 and proceeds to step 304.

At step 304, a PSTN endpoint initiates a call to an IP endpoint. In one embodiment, initiation of the call from the PSTN endpoint to the IP endpoint may comprise generating a connection request message. For example, one of the PSTN endpoints 106 may initiate a call to one of the IP endpoints 122. At step 306, the PSTN endpoint signals a TDM local switch to indicate the call initiation. In one embodiment, signaling the TDM local switch may comprise transmitting a connection request message from the PSTN endpoint to the TDM local switch. For example, the PSTN endpoint 106 that initiated the call may signal TLS 104.

At step 308, the TDM local switch transmits the connection request message to a TDM-IP gateway. For example, TLS 104 may transmit the connection request message to TIG 110. At step 310, the TDM-IP gateway receives the connection request message. At step 312, the TDM-IP gateway generates a connection setup message in response to the connection request message. In one embodiment, the connection setup message may comprise a message for establishing a media path between the TDM-IP gateway and a border element in the IP network. In one embodiment, at least a portion of the connection request message received by the TDM-IP gateway may be adapted to form the connection setup message.

At step 314, the TDM-IP gateway transmits the connection setup message to a border element. For example, TIG 110 may transmit the connection request message to one of the BEs 116 to which TIG 110 is directly connected (illustratively, at least one of BE $116_1$ and BE $116_2$). At step 316, the border element receives the connection setup message. For example, BE $116_2$ may receive the connection setup message from TIG 110. At step 318, the border element transmits the connection setup message to a call control element. For example, BE $116_2$ may transmit the connection setup message to CCE 118 via one of the associated SIP sessions 120.

At step 320, the call control element receives the connection setup message. For example, CCE 118 receives the connection setup message from BE $116_2$ via one of the associated SIP sessions 120. At step 322, the call control element processes the connection setup message to identify a border element associated with the called IP endpoint. For example, the CCE 118 processes the connection setup message in order to identify at least one border element associated with the connection setup message (e.g., BE $116_5$). In one embodiment, the border element associated with the called IP endpoint may be denoted as an egress border element.

At step 324, the call control element signals the egress border element for establishing a media path between the TDM-IP gateway and the egress border element. For example, CCE 118 signals BE $116_5$ for establishing a media path between TIG 110 and BE $116_5$. In one embodiment, in which TLS 104 comprises packet processing interface 105, CCE 118 may signal BE $116_5$ for establishing a media path between TLS 104 and BE $116_5$. In one embodiment, the media path may be utilized for supporting traffic associated with the connection between the PSTN endpoint and the IP endpoint.

At step 326, a determination is made as to whether establishment of the media path is successful. In one embodiment, a media path status message may be received in response to the signaling from the call control element to an egress border element for establishing a media path. In one embodiment, the media path status message may comprise an indication that establishment of the media path is successful. In another embodiment, the media path status message may comprise an indication that establishment of the media path is unsuccessful. In one embodiment, the media path status message may be received by CCE 118. If establishment of the media path is successful, method 300 proceeds to step 328 and step 330. If establishment of the media path is not successful, method 300 proceeds to step 338.

At step 328 the egress border element signals the IP endpoint to provide an indication of an incoming call. The method 300 then proceeds to step 336. At step 330, the egress border element signals the call control element with an indication that the media path is successfully established. At step 332, the call control element signals the TDM-IP gateway providing an indication that the media path was successfully established. At step 334, the TDM-IP gateway signals the PSTN endpoint via the TDM local switch, providing an indication that the media path was successfully established. The method 300 then proceeds to step 336.

As described above, in one embodiment, the CCE receives a media path status message in response to the signaling from the call control element to an egress border element for establishing a media path. In one embodiment, the call control element may initiate at least one connection status message in response to the media path status message. In another embodiment, upon receiving a connection status message, the TDM-IP gateway may generate at least one additional connection setup message in response to a determination that the at least one connection status message is indicative of a failure to establish the at least one media path. In one embodiment, each of the at least one additional connection setup message may be operable for establishing the at least one media path that was not successfully established during at least one previous attempt.

For example, the TIG 110 signals the PSTN endpoint that initiated the call (via TLS 104) to provide an indication that a connection with the called IP endpoint is successfully established (e.g., that the IP endpoint is ringing). Furthermore, BE 116$_5$ signals CCE 118 with an indication that the media path is successfully established by transmitting a media path status message to CCE 118. The CCE 118 then signals the TIG 110 via BE 116$_2$ with an indication that the media path between TIG 110 and BE 116$_2$ is successfully established. It should be noted that the signaling of the called IP endpoint (step 328) may be performed contemporaneously with acknowledgement signaling from the BE 116$_2$ to the calling PSTN endpoint (steps 330, 332, and 334).

At step 336, the connection established between the calling PSTN endpoint and the called IP endpoint is successfully established, and is supported by the media path successfully established between the TDM-IP gateway (illustratively, TIG 110) and the egress border element (illustratively, BE 116$_2$). The method 300 then proceeds to step 348, where the method 300 ends.

At step 338, the egress border element signals the call control element with an indication that the media path is not successfully established. At step 340 the call control element signals the TDM-IP gateway providing an indication that the media path was not successfully established. For example, BE 116$_5$ signals CCE 118, which in turn signals TIG 110 via BE 116$_2$, to provide an indication that the media path is not successfully established.

At step 342, the TDM-IP gateway determines whether an additional connection setup message is generated. If an additional connection setup message is generated, method 300 proceeds to step 344. At step 344, the TDM-IP gateway generates an additional connection setup message. The method 300 then returns to step 314, at which point the TDM-IP gateway transmits the additional connection setup message to the border element. If an additional connection setup message is not generated, the method 300 proceeds to step 346. At step 346, the TDM-IP gateway signals the PSTN endpoint that the connection is not successfully established. The method 300 then proceeds to step 348 where method 300 ends.

It is contemplated that at least a portion of the described functions may be combined into fewer functional elements/devices, may be performed by other functional elements, or that the various functions may be distributed across the functional elements in a different manner. For example, at least a portion of the functionality described herein with respect to the TDM-IP gateway 110 may be distributed across the TLS 104, BEs 116, and CCE 118. Similarly, at least a portion of the functionality described herein with respect to TLS 104, BEs 116, and CCE 118 may be distributed across those functional elements in a different manner.

Figure 4:
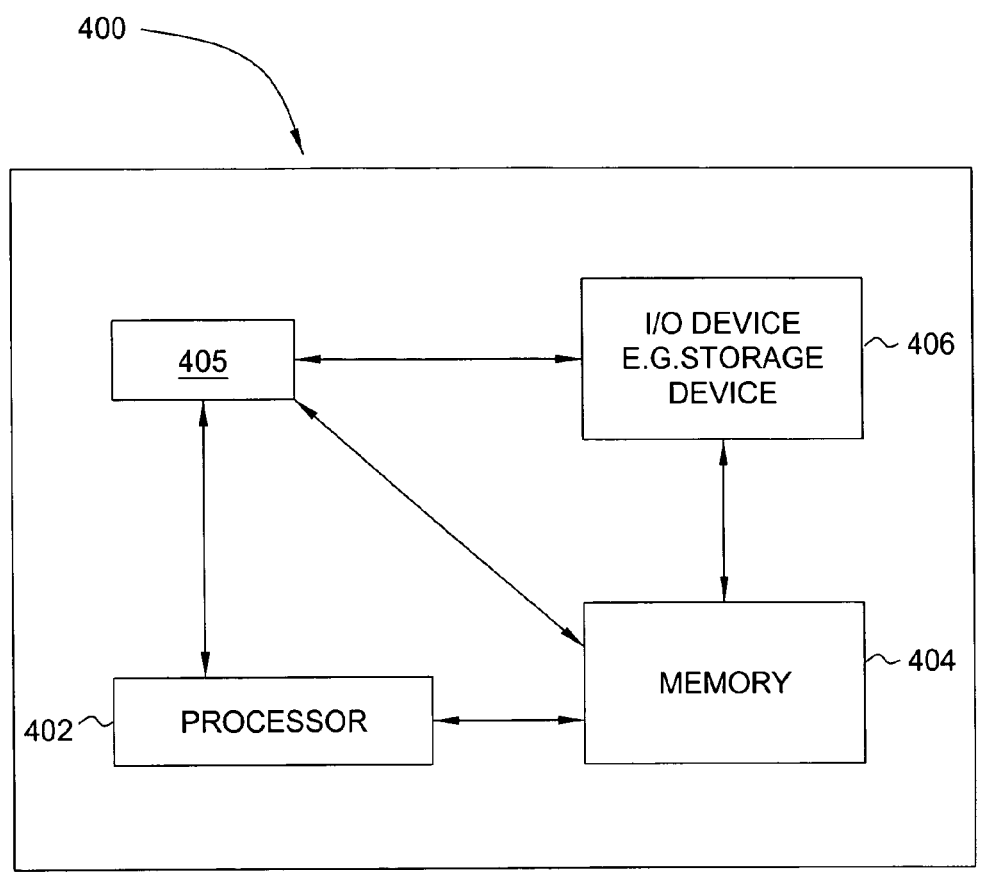
FIG. 4 depicts a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a media path establishment module 405, and various input/output devices 406 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present media path establishment module or process 405 can be loaded into memory 404 and executed by processor 402 to implement the functions as discussed above. As such, the present media path establishment process 405 (including associated data structures) of the present invention can be stored on a computer readable medium or carrier, e.g., RAM memory, magnetic or optical drive or diskette and the like.

Although various embodiments which incorporate the teachings of the present invention have been shown and described in detail herein, those skilled in the art can readily devise many other varied embodiments that still incorporate these teachings.

What is claimed is:

1. A method for establishing a media path, comprising:
receiving, by a processor of a gateway system, a connection request message intended for a called endpoint in an internet protocol communication network from a time division multiplexing local switch located in a publicly switched telephone network, wherein the time division multiplexing local switch includes a packet processing interface for packetizing time division multiplexing traffic transmitted from the time division multiplexing local switch towards the internet protocol communication network and depacketizing internet protocol traffic transmitted from the gateway system towards the publicly switched telephone network;
generating, by the processor, a connection setup message in response to the connection request message, wherein at least a portion of the connection request message is used to form the connection setup message;
transmitting, by the processor, the connection setup message towards the internet protocol communication network comprising a call control element via an ingress border element wherein the connection setup message is received at the call control element, the connection setup message operable to establish the media path directly between the gateway system and an egress border element, wherein the call control element identifies the egress border element associated with the called endpoint from a plurality of egress border elements and signals the egress border element for establishing the media path, wherein the gateway system is located outside the internet protocol communication network associated with the egress border element, wherein the time division multiplexing local switch, the call control element, the ingress border element, the gateway system and the egress border element are different elements; and
determining, by the processor, that an establishment of the media path between the egress border element and the gateway system is successful to have the egress border element signal the called endpoint in the Internet protocol communication network to provide an indication of an incoming call.

2. The method of claim 1, wherein the media path comprises a portion of a respective connection.

3. The method of claim 2, wherein the connection is established between the called endpoint that comprises an internet protocol endpoint and a publicly switched telephone network endpoint.

4. The method of claim 1, wherein the determining further comprises:
   receiving a media path status message in response to the signaling; and
   initiating a connection status message in response to the media path status message.

5. The method of claim 4, further comprising:
   generating an additional connection setup message, the additional connection setup message generated in response to a determination that the connection status message is indicative of a failure to establish the media path, wherein the additional connection setup message is operable to establish the media path.

6. A non-transitory computer readable medium storing a software program, that, when executed by a processor of a gateway system, causes the processor to perform operations, the operations comprising:
   receiving, by the gateway system, a connection request message intended for a called endpoint in an internet protocol communication network from a time division multiplexing local switch located in a publicly switched telephone network, wherein the time division multiplexing local switch includes a packet processing interface for packetizinq time division multiplexing traffic transmitted from the time division multiplexing local switch towards the internet protocol communication network and depacketizinq internet protocol traffic transmitted from the gateway system towards the publicly switched telephone network;
   generating a connection setup message in response to the connection request message, wherein at least a portion of the connection request message is used to form the connection setup message;
   transmitting the connection setup message towards the internet protocol communication network comprising a call control element via an ingress border element wherein the connection setup message is received at the call control element, the connection setup message operable to establish the media path directly between the gateway system and an egress border element, wherein the call control element identifies the egress border element associated with the called endpoint from a plurality of egress border elements and signals the egress border element for establishing the media path, wherein the gateway system is located outside the internet protocol communication network associated with the egress border element, wherein the time division multiplexing local switch, the call control element, the ingress border element, the gateway system and the egress border element are different elements; and
   determining that an establishment of the media path between the egress border element and the gateway system is successful to have the egress border element signal the called endpoint in the internet protocol communication network to provide an indication of an incoming call.

7. The non-transitory computer readable medium of claim 6, wherein the media path comprises a portion of a respective connection.

8. The non-transitory computer readable medium of claim 7, wherein the connection is established between the called endpoint that comprises an internet protocol endpoint and a publicly switched telephone network endpoint.

9. The non-transitory computer readable medium of claim 6, wherein the determining further comprises:
   receiving a media path status message in response to the signaling; and
   initiating a connection status message in response to the media path status message.

10. The non-transitory computer readable medium of claim 9, further comprising:
    generating an additional connection setup message, the additional connection setup message generated in response to a determination that the connection status message is indicative of a failure to establish the media path;
    wherein the additional connection setup message is operable to establish the media path.

11. An apparatus for establishing a media path, comprising:
    a processor of a gateway system; and
    a computer-readable medium storing a plurality of instructions which, when executed by the processor, cause the processor to perform operations, the operations comprising:
        receiving a connection request message intended for a called endpoint in an internet protocol communication network from a time division multiplexing local switch located in a publicly switched telephone network, wherein the time division multiplexing local switch includes a packet processing interface for packetizinq time division multiplexing traffic transmitted from the time division multiplexing local switch towards the internet protocol communication network and depacketizing internet protocol traffic transmitted from the gateway system towards the publicly switched telephone network;
    generating a connection setup message in response to the connection request message, wherein at least a portion of the connection request message is used to form the connection setup message;
    transmitting the connection setup message towards the internet protocol communication network comprising a call control element via an ingress border element wherein the connection setup message is received at the call control element, the connection setup message operable to establish the media path directly between the gateway system and an egress border element, wherein the call control element identifies the egress border element associated with the called endpoint from a plurality of egress border elements and signals the egress border element for establishing the media path, wherein the gateway system is located outside the internet protocol communication network associated with the egress border element, wherein the time division multiplexing local switch, the call control element, the ingress border element, the gateway system and the egress border element are different elements; and
    determining that an establishment of the media path between the egress border element and the gateway system is successful to have the egress border element signal the called endpoint in the internet protocol communication network to provide an indication of an incoming call.

12. The apparatus of claim 11, wherein the call control element receives the connection setup message and signals the egress border element for establishing the media path.

* * * * *